United States Patent [19]
Shepherd

[11] 3,991,830
[45] Nov. 16, 1976

[54] LAND CLEARING DEBRIS PULVERIZER

[75] Inventor: Willard W. Shepherd, Whittier, Calif.

[73] Assignee: Shepherd Machinery Co., Los Angeles, Calif.

[22] Filed: Feb. 3, 1975

[21] Appl. No.: 546,384

[52] U.S. Cl. .............................. 172/180; 172/156; 172/32; 299/40; 172/713
[51] Int. Cl.² ................ A01B 49/02; A01B 35/18; A01B 77/00
[58] Field of Search ............ 172/174, 32, 156, 160, 172/548, 549, 177, 180; 299/40

[56] References Cited
UNITED STATES PATENTS

| | | | |
|---|---|---|---|
| 848,977 | 4/1907 | Davis | 172/174 |
| 1,023,043 | 4/1912 | Scow | 172/174 X |
| 1,332,921 | 3/1920 | Seaman | 172/174 X |
| 1,425,976 | 8/1922 | Kent | 172/32 X |
| 2,965,053 | 12/1960 | Gruber | 172/174 |
| 3,794,122 | 2/1974 | Rohrer | 172/174 X |

*Primary Examiner*—George J. Marlo
*Attorney, Agent, or Firm*—Harris, Kern, Wallen & Tinsley

[57] ABSTRACT

An apparatus for pulverizing debris in land clearing operations, or the like, including: a frame; a ground engaging drum rotatably mounted on the frame and carrying generally radial teeth, and specifically conventional sheeps feet; and a forwardly facing debris pickup and breaker assembly carried by the frame for feeding debris to the rotor teeth in response to forward movement of the frame, and cooperating with the rotor teeth to break up the debris.

1 Claim, 7 Drawing Figures

LAND CLEARING DEBRIS PULVERIZER

BACKGROUND OF THE INVENTION

In land clearing operations, it is necessary to break up any debris into pieces small enough that it can be accommodated by equipment subsequently used to till the soil. The debris to be pulverized may include anything from brush to trees. Normally, larger trees are disposed of in other ways, but land clearing operations with which the present invention is intended to cope frequently involve trees, or tree branches, up to as large as four to six inches or so in diameter.

Some prior devices with which I am familiar utilize the ground as an anvil to support the debris for cutting into small pieces by blades on a rotor. This approach works fairly well if the ground is hard, or relatively so, but is completely ineffective if the ground is soft since, under such conditions, the cutting blades merely push the debris, or much of it, downwardly into the soft soil, and fail to break it up.

Another type of device with which I am familiar involves the use of wheel supported, and wheel or power driven, rotary cutters operating against pickup fingers which deliver the debris to the cutters. Devices of this nature operate much more effectively than those of the type discussed in the preceding paragraph, but are relatively complicated.

Prior United States patents with which I am familiar, and which disclose devices of the foregoing two types, include:

| | |
|---|---|
| 843,479 Becerra | 1,865,686 Gilson |
| 1,156,234 Jones | 2,553,356 Cady |
| 1,639,837 Burner | 2,974,472 Gebhart |
| 1,786,455 Robbins | 3,121,987 Harris |

SUMMARY AND OBJECTS OF INVENTION

With the foregoing background in mind, the primary object of the present invention is to provide a very simple and effective apparatus for breaking up debris in land clearing operations, or the like.

More particularly, a primary object is to provide an apparatus which does not use the ground as an anvil, and which does not require a wheel supported, driven rotor.

Still more particularly, a basic object of the invention is to provide a debris pulverizing rotor which rolls directly on the ground and which cooperates with a debris pickup assembly for feeding the debris to teeth on the rotor.

The invention may be summarized as including, and a further important object is to provide an apparatus which includes: a frame; a ground engaging rotor rotatably mounted on the frame and carrying generally radial teeth; and a forwardly facing debris pickup and breaker assembly carried by the frame for feeding debris to the rotor teeth, in response to forward movement of the frame, and cooperating with the rotor teeth to break up the debris.

Another object of the invention is to provide an apparatus wherein the pickup and breaker assembly includes pickup fingers which are spaced apart laterally of the frame, and wherein the rotor teeth are arranged in transversely spaced circumferential rows and pass between the pickup fingers.

Other objects are to provide an apparatus wherein the pickup fingers terminate at their rearward ends in breaker bars, and wherein the rotor is simply a drum having conventional sheeps feet thereon cooperating with the breaker bars to break up the debris.

A further important object of the invention is to provide an apparatus of the foregoing character in which the pickup and breaker assembly is retractable upwardly and rearwardly to dump any accumulated debris which may tend to clog this assembly.

The foregoing objects, advantages, features and results of the present invention, together with various other objects, advantages, features and results thereof which will be evident to those skilled in the debris pulverizing art in land clearing operations, may be achieved with the exemplary embodiment of the invention illustrated in the accompanying drawings and described in detail hereinafter.

DESCRIPTION OF EXEMPLARY EMBODIMENT OF INVENTION

Figure 1:
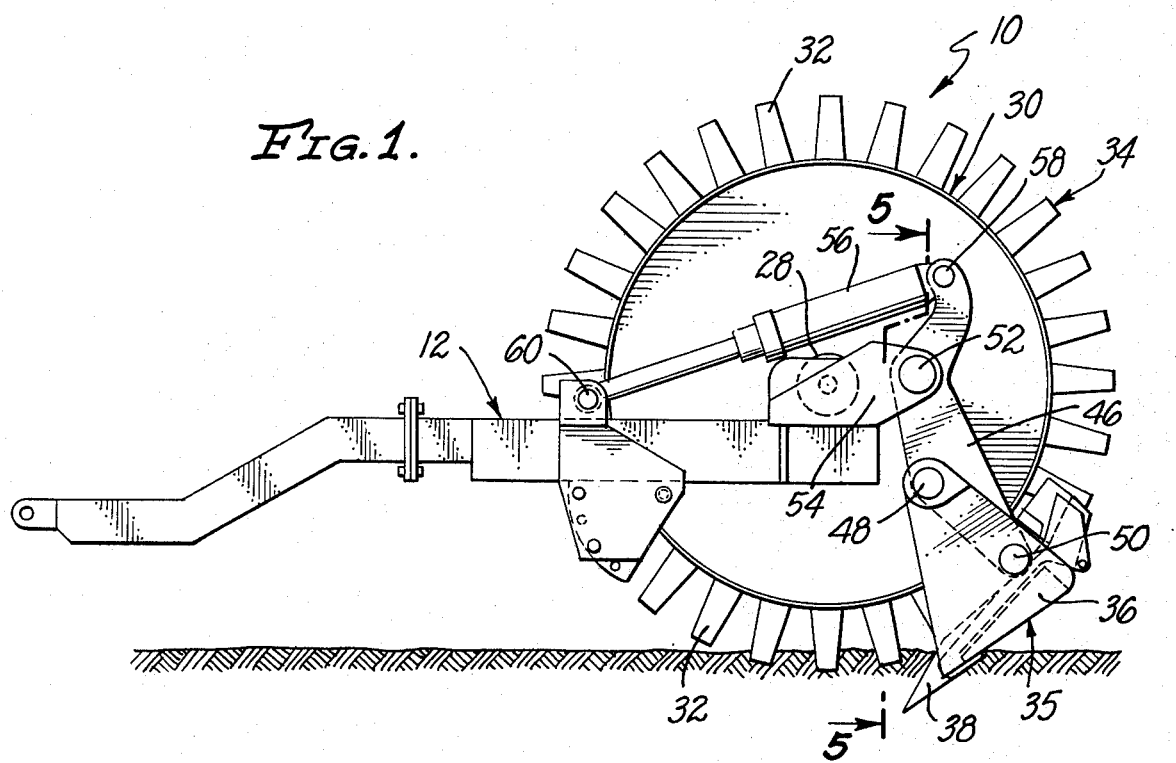
FIG. 1 is a side elevational view of the apparatus of the invention in its operating condition.

The pulverizing apparatus of the invention is designated generally in the drawings by the numeral 10 and includes a frame 12 which, in the particular construction illustrated, is intended to be drawn by a tractor, not shown. However, the apparatus 10 may be self propelled if desired.

Figure 2:
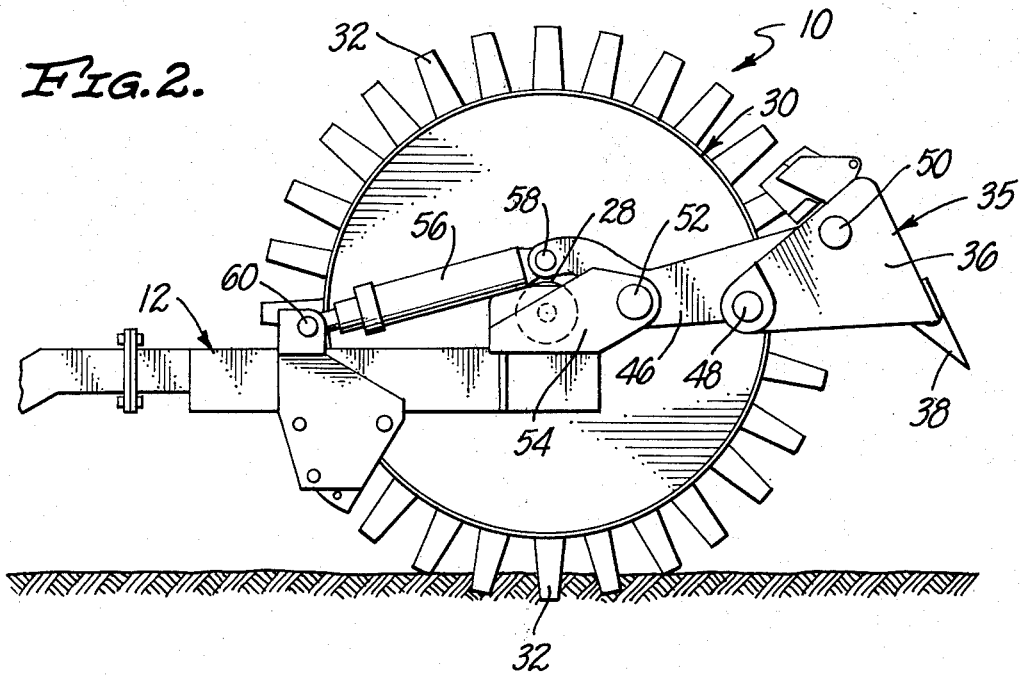
FIG. 2 is a fragmentary side elevational view similar to FIG. 1, but showing the apparatus in a debris dumping condition.
Figure 3:
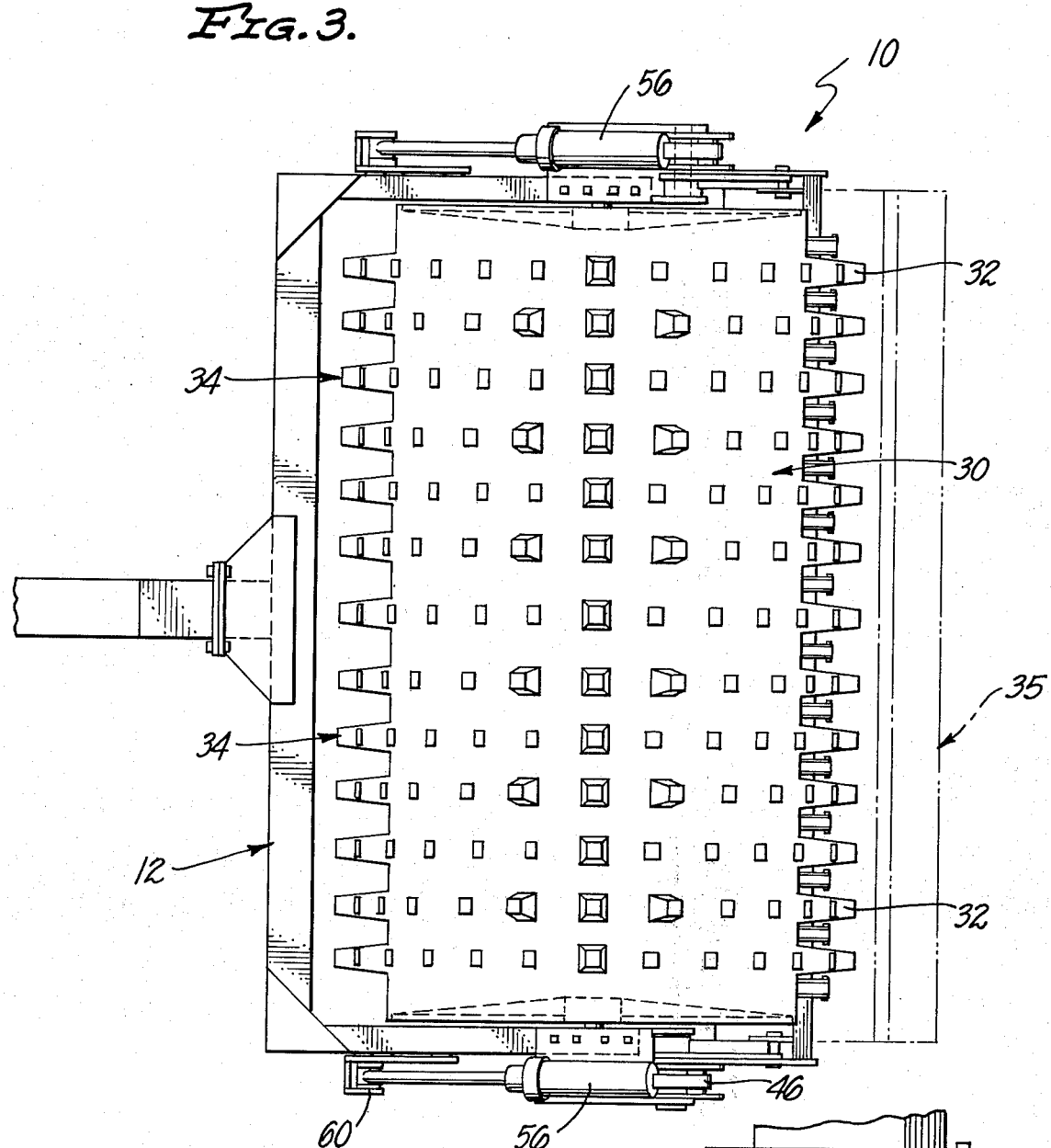
FIG. 3 is a top plan view of the apparatus of the invention in its operating condition.
Figure 4:
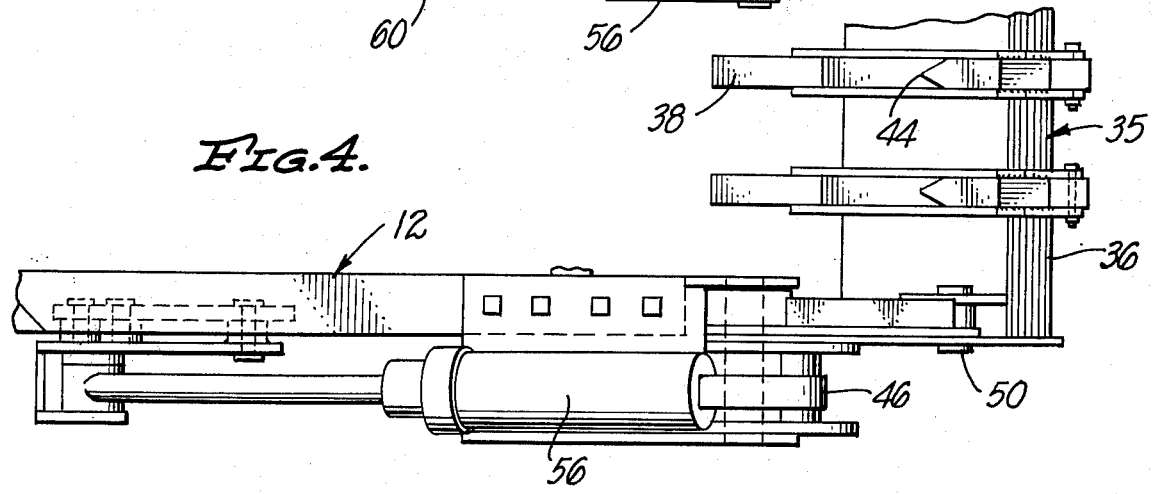
FIG. 4 is an enlarged, fragmentary top plan view showing a portion of a debris pickup and breaker assembly of the invention.
Figure 6:
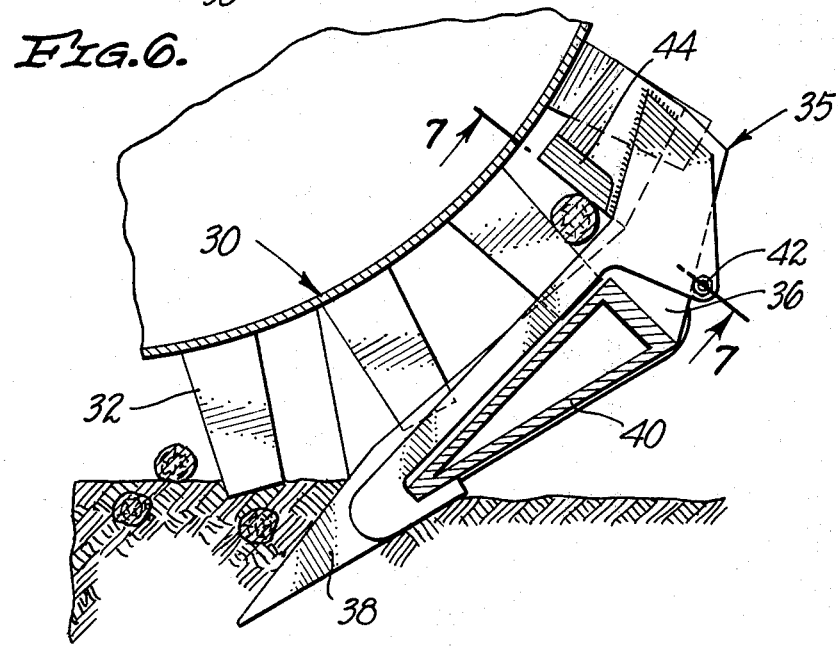
FIG. 6 is a fragmentary sectional view taken as indicated by the arrowed line 6—6 of FIG. 5 and showing the manner in which the apparatus breaks up debris.

Extending transversely across and rotatably mounted on the main frame 12 by bearings 28 is a rotor 30 rotatable about a transverse horizontal axis and preferably having the form of a drum. The rotor 30 carries generally radial teeth 32, which are preferably conventional sheeps feet. These teeth 32 are arranged in transversely spaced circumferential rows 34, each row including a plurality of circumferentially spaced teeth 32. In operation of the apparatus 10, the rotor teeth 32 engage the ground, as indicated in FIGS. 2 and 6 of the drawings.

Figure 7:
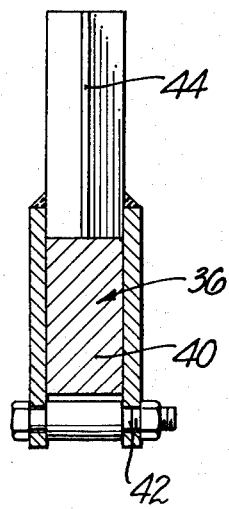
FIG. 7 is a fragmentary sectional view taken as indicated by the arrowed line 7—7 of FIG. 6 of the drawings.

Rearwardly of the lower portion of the rotor 30 is a transversely extending, debris pickup and breaker assembly 35, comprising a pickup frame 36 carrying removable, transversely spaced, pickup fingers 38. These fingers extend forwardly and downwardly in the operating condition of the apparatus 10, as shown in FIGS. 1 and 6. The pickup fingers 38 are merely slipped over a corresponding part 40 of the pickup frame 36, and held in place by a bolt 42, as shown in FIGS. 6 and 7. Thus, the pickup fingers 38 can readily be removed if desired. Each pickup finger 38 terminates at its rearward end in a forwardly facing breaker block or bar 44, best shown in FIGS. 4 to 7. Together, the pickup fingers 38 and the breaker bars 44 at the rearward ends thereof constitute the pickup and breaker assembly 35.

The ends of the pickup frame 36 are mounted on arms 46 at opposite sides of the frame 12. The ends of the pickup frame 36 are connected to the arms 46 at the points 48 and 50.

The arms 46 are mounted on transversely spaced, axially aligned, transverse pivots 52 carried by laterally spaced mounting brackets 54 at opposite sides of the frame 12. Rams 56 are pivotally connected to the arms 46 at 58 and are pivotally connected to the frame 12 at opposite ends of the rotor 30 at 60.

As will be apparent from a comparison of FIGS. 1 and 2, by contracting the rams 56, the pickup and breaker assembly 35 may be lifted rearwardly and upwardly, as shown in FIG. 2, to dump therefrom any accumulated debris which may tend to clog same, which is an important feature of the invention. It will be noted that the axis of the pivots 52 is offset rearwardly from the axis of the rotor 30. Consequently, as the pickup and breaker assembly 35 is lifted rearwardly and upwardly, it moves away from the rotor, as will be apparent from a comparison of FIGS. 1 and 2, to facilitate dumping any accumulated debris.

Figure 5:
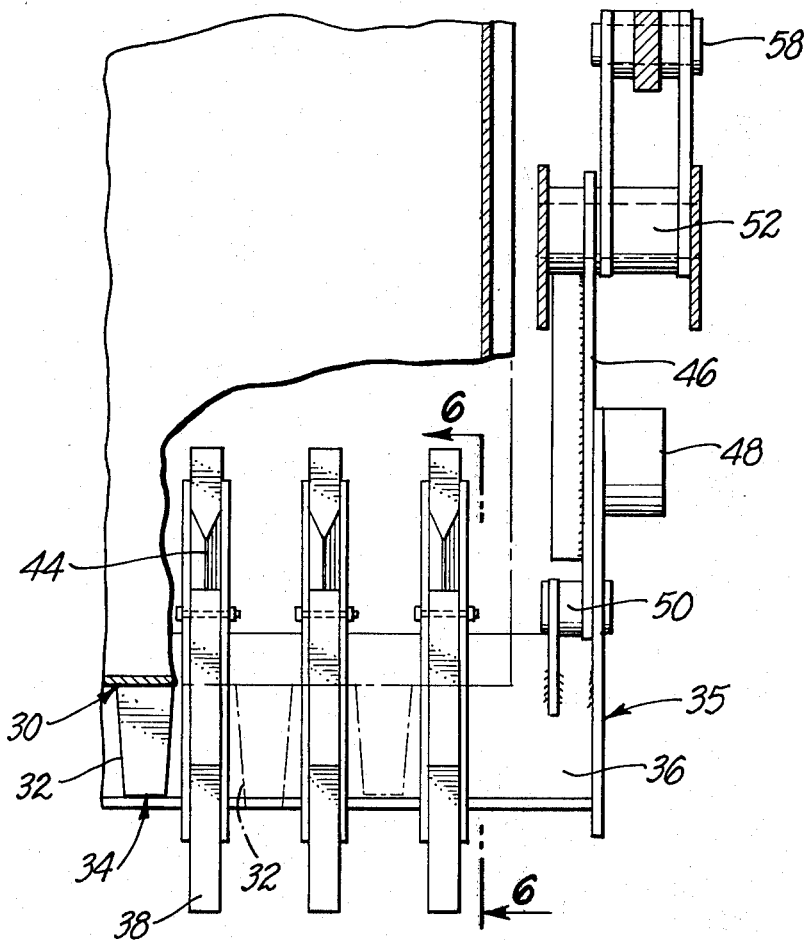
FIG. 5 is a fragmentary sectional view on an enlarged scale taken as indicated by the arrowed line 5—5 of FIG. 1.

The pickup fingers 38 and breaker bars 44 are so spaced that the circumferential rows 34 of radial rotor teeth 32 pass between adjacent fingers and breaker bars, as best shown in FIG. 5 of the drawings.

Considering the operation of the invention, it will be apparent that, when in the condition shown in FIGS. 1 and 6, the pickup fingers 38 root up debris from the ground, in response to forward movement of the main frame 12, and deliver such debris to the breaker bars 44 at the rearward ends of the fingers, whereat the debris is broken up into smaller pieces by the rotor teeth 32 passing between the breaker bars at the rearward ends of the pickup fingers. By utilizing relatively closely spaced pickup fingers 38 and breaker bars 44, and relatively closely spaced rows 34 of rotor teeth 32, the debris to be pulverized can be broken up into relatively short lengths, which is an important feature.

From the foregoing, it will be apparent that the pulverizing apparatus 10 of the invention avoids the problems associated with prior devices which utilize the ground as an anvil, since there is a positive breaking action as the result of the cooperation between the rotor teeth 32 and the breaker bars 44 at the rearward ends of the pickup fingers 38. Also, the present invention avoids the complexity of other apparatuses which use fingers and rotor teeth, but which use wheel or power driven rotors. With the present invention, the rotor 30 itself runs directly on the ground and, since it is a drum, its penetration into even soft ground is limited. Any wheel supported apparatus is likely to sink too deeply into soft ground, something which cannot occur with the drum-type rotor 30 of the apparatus 10.

Although an exemplary embodiment of the invention has been disclosed for illustrative purposes, it will be understood that various changes, modifications and substitutions may be incorporated in such embodiment without departing from the invention as hereinafter claimed.

I claim as my invention:

1. In an apparatus for pulverizing debris in land clearing operations, or the like, the combination of:
    a. a frame;
    b. a ground engaging rotor extending transversely across said frame and mounted thereon for rotation about a transverse axis of rotation and carrying generally radial, ground engaging teeth arranged in transversely spaced, circumferential rows;
    c. debris pickup and breaking means carried by said frame for feeding debris to said rotor teeth in response to forward movement of said frame, and cooperating with said rotor teeth to break up the debris;
    d. said pickup and breaking means comprising pickup fingers having forward and rearward ends and spaced apart laterally of said frame, and comprising breaker bars at the rearward ends of and generally perpendicular to said pickup fingers, said rows of rotor teeth passing between said pickup fingers and breaker bars;
    e. said pickup and breaking means being pivotally mounted on said frame for movement relative thereto about a transverse pivot axis, said pivot axis being offset rearwardly of said axis of rotation and said pickup and breaking means being pivotable about said pivot axis between an extended, operative position below and rearwardly of said axis of rotation and a retracted, inoperative position rearwardly of said axis of rotation and above ground level, whereby said pickup and breaking means moves rearwardly away from said rotor as it pivots upwardly and rearwardly from its extended position to its retracted position so as to facilitate dumping of any debris caught in said pickup and breaking means; and
    f. Means for pivoting said pickup and breaking means between its extended and retracted positions.

* * * * *